(12) United States Patent
Gravina et al.

(10) Patent No.: US 10,823,260 B2
(45) Date of Patent: Nov. 3, 2020

(54) TRANSMISSION DEVICE FOR SPLITTING TORQUE BETWEEN TWO COAXIAL GEARS, IN PARTICULAR FOR A PLANETARY GEARING FOR AERONAUTIC APPLICATIONS, AND METHOD FOR MANUFACTURING AND ASSEMBLING SAID TRANSMISSION DEVICE

(71) Applicant: GE Avio S.r.l., Rivalta di Torino (IT)

(72) Inventors: Michele Gravina, Rivalta di Torino (IT); Marco Facchini, Rivalta di Torino (IT)

(73) Assignee: GE Avio S.r.l., Rivalta di Torino (IT)

( * ) Notice: Subject to any disclaimer, the term of this patent is extended or adjusted under 35 U.S.C. 154(b) by 47 days.

(21) Appl. No.: 16/020,064

(22) Filed: Jun. 27, 2018

(65) Prior Publication Data
US 2019/0024755 A1 Jan. 24, 2019

(30) Foreign Application Priority Data

Jul. 21, 2017 (EP) .................................... 17425076

(51) Int. Cl.
*F16H 1/46* (2006.01)
*F16H 1/28* (2006.01)
(Continued)

(52) U.S. Cl.
CPC ............... *F16H 1/46* (2013.01); *F02C 7/36* (2013.01); *F16H 1/2845* (2013.01);
(Continued)

(58) Field of Classification Search
None
See application file for complete search history.

(56) References Cited

U.S. PATENT DOCUMENTS 3,188,888 A 6/1965 Zink et al.
3,401,580 A * 9/1968 Hans Sigg ............ F16H 1/2845
475/344

(Continued)

FOREIGN PATENT DOCUMENTS

EP 1113193 A2 7/2001
GB 1 072 754 A 6/1967
(Continued)

OTHER PUBLICATIONS

Partial European Search Report and Opinion corresponding EP Application No. 17425076.1 dated Nov. 29, 2017.

(Continued)

*Primary Examiner* — Timothy Hannon
(74) *Attorney, Agent, or Firm* — Dority & Manning, P.A.

(57) ABSTRACT

A transmission device for splitting torque between two coaxial gears, in particular for a planetary gearing for aeronautic applications, has a motion input member and two transmission members, which are coaxial and have respective shafts provided with gears at an axial end and respective external flanges, at the opposite axial end; the two flanges are axially facing and placed abutting against each other, and are fixed to the motion input member so as to split the torque transmitted from the motion input member between the two flanges; one of the two shafts is axially hollow and houses, with radial clearance, an intermediate portion of the other shaft; the latter is formed by at least two pieces which are coaxial and fixed to each other.

9 Claims, 11 Drawing Sheets (51) Int. Cl.
*F02C 7/36* (2006.01)
*F16H 57/08* (2006.01)
*F16H 57/023* (2012.01)
*B23K 20/12* (2006.01)

(52) U.S. Cl.
CPC ........... *F16H 1/2863* (2013.01); *F16H 57/08* (2013.01); *B23K 20/12* (2013.01); *F05D 2260/40311* (2013.01); *F16H 57/023* (2013.01); *F16H 2001/289* (2013.01)

(56) References Cited

U.S. PATENT DOCUMENTS

| | | | | |
|---|---|---|---|---|
| 4,096,769 | A | * | 6/1978 | Horikiri ................ F16H 1/2818 475/347 |
| 5,433,674 | A | | 7/1995 | Sheridan et al. |
| 5,667,455 | A | * | 9/1997 | Suzuki ................ B60K 17/046 384/512 |
| 7,591,754 | B2 | | 9/2009 | Duong et al. |
| 8,016,716 | B2 | * | 9/2011 | de Ugarte ............. F16H 57/082 475/331 |
| 8,096,917 | B2 | | 1/2012 | Benito |
| 9,541,007 | B2 | | 1/2017 | McCune et al. |
| 2012/0302387 | A1 | * | 11/2012 | Scekic ................ F16H 37/0826 475/5 |
| 2016/0169289 | A1 | | 6/2016 | Kowalewski et al. |
| 2018/0023667 | A1 | * | 1/2018 | Pinnekamp ............... F16H 1/22 475/346 |
| 2019/0085973 | A1 | * | 3/2019 | Venter ....................... F16H 1/28 |

FOREIGN PATENT DOCUMENTS

| | | |
|---|---|---|
| JP | S50-113662 A | 9/1975 |
| WO | 2015/015425 A1 | 2/2015 |

OTHER PUBLICATIONS

European Search Report and Opinion corresponding EP Application No. 17425076.1 dated Mar. 19, 2018.

* cited by examiner

TRANSMISSION DEVICE FOR SPLITTING TORQUE BETWEEN TWO COAXIAL GEARS, IN PARTICULAR FOR A PLANETARY GEARING FOR AERONAUTIC APPLICATIONS, AND METHOD FOR MANUFACTURING AND ASSEMBLING SAID TRANSMISSION DEVICE

FIELD OF INVENTION

The present invention relates to a transmission device for splitting torque between two coaxial gears, in particular for a planetary gearing for aeronautic applications.

BACKGROUND OF THE INVENTION

As is known, in the field of aeronautical engines planetary gearings are widely used to transmit motion and convert power between a turbo power unit (with high speed and low torque) and at least one propulsive element (with high torque and low speed), as they implement such function very efficiently while being lightweight and compact.

One known solution is described in European patent EP1113193 and comprises an input shaft and an output shaft, which are coaxial to one another along an axis, rotate about said axis and are coupled to one another by means of a planetary gearing. Said gearing has a planetary carrier or gear carrier structure, which supports two arrays of planet gears. Each of the two arrays of planet gears meshes with a respective sun gear, made to rotate by the input shaft.

The two arrays of planet gears define two stages in which the torque from the input shaft is split and follows separate torque transmission paths. In this way, the loads transmitted between the teeth of the gears are lower than when the torque is transmitted to a single array of planets. Thus, the solution achieved is relatively compact, with no reduction in the overall power generated by the gearing.

The torque from the input shaft is transmitted and split between the two sun gears by means of a transmission device comprising two hollow transmission shafts, which are coaxial to the input shaft and comprise respective intermediate portions fitted one inside the other with a certain amount of radial clearance. The sun gears are formed integrally on a respective axial end of said transmission shafts. At the opposite axial end, the two transmission shafts end with respective flanges, which axially support one another and are fixed to a flange of the input shaft, so as to define a transmission coupling that causes both shafts to rotate. Therefore, when the torque is transmitted from the flange of the input shaft to the other two flanges, it is automatically split between the two transmission shafts, according to the relative torsional rigidity between the two torque paths and according to the manufacturing and assembly tolerances of the transmission device.

Three conditions must be met in order for the loads to be distributed evenly across the gears and across the bearings of the gearing: (i) the rigidity of the two torque paths must be perfectly balanced, (ii) maximum precision must be guaranteed in the alignment (angular phasing) of the two sun gears, (iii) the teeth of the sun gears must be equally spaced angularly about all 360°.

The need is felt to improve the solutions known in the prior art, of the type described above, so that the transmission device for splitting torque between two sun gears can be manufactured and assembled simply, and so as to reduce the errors in construction and assembly.

The purpose of the present invention is to provide a transmission device for splitting torque between two coaxial gears, in particular for a planetary gearing for aeronautic applications, which satisfies the above need in a simple and economical manner.

According to the invention, this purpose is achieved with a transmission device for splitting torque between two coaxial gears, in particular for a planetary gearing for aeronautic applications, as disclosed in claim 1.

The present invention also relates to methods for manufacturing and assembling a transmission device, as disclosed in claims 12 and 15.

BRIEF DESCRIPTION OF THE DRAWINGS

In order to better understand the present invention, some non-limiting embodiments thereof will now be described purely by way of example with reference to the accompanying drawings, in which.

DETAILED DESCRIPTION

Figure 1:
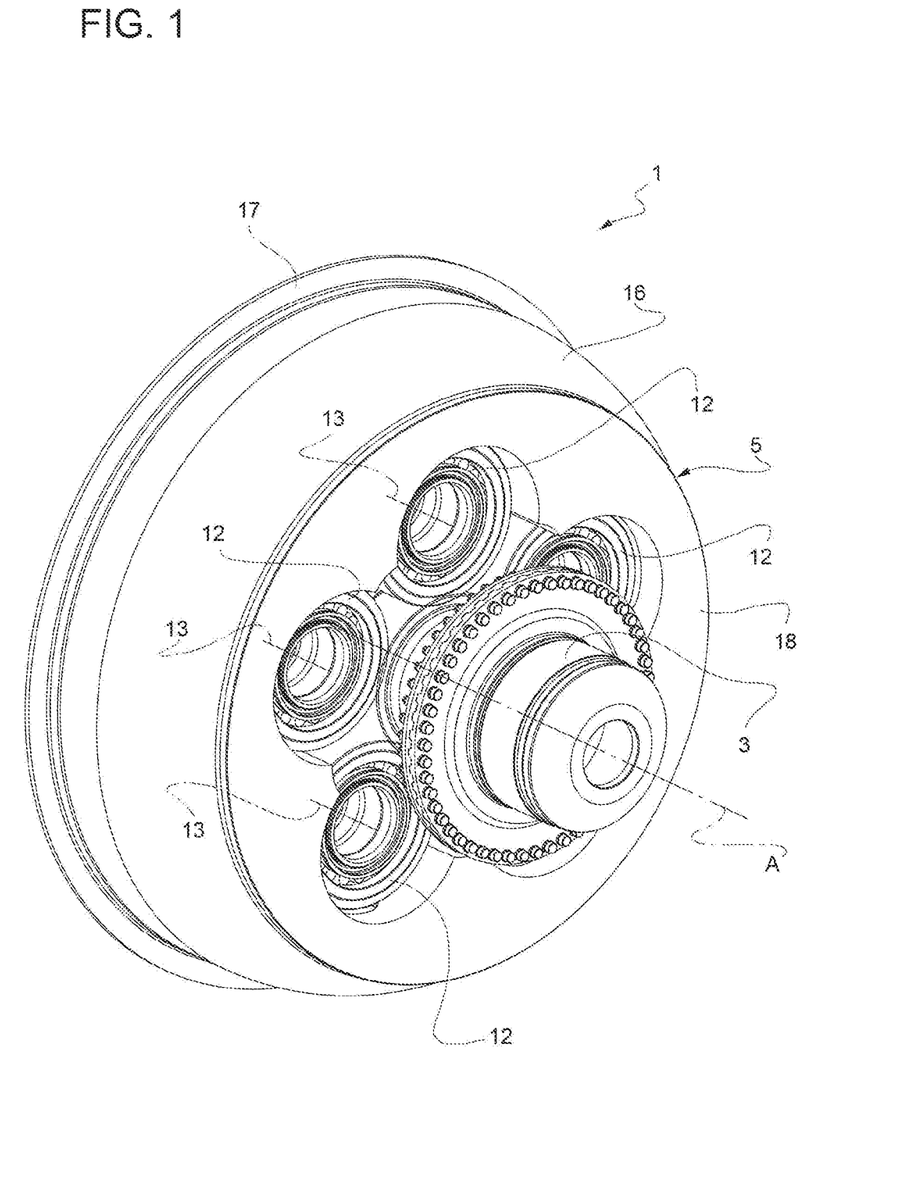
FIG. 1 is a perspective view of a planetary gearing for aeronautic applications provided with a first embodiment of the transmission device for splitting torque between two coaxial gears, according to the present invention.
Figure 2:
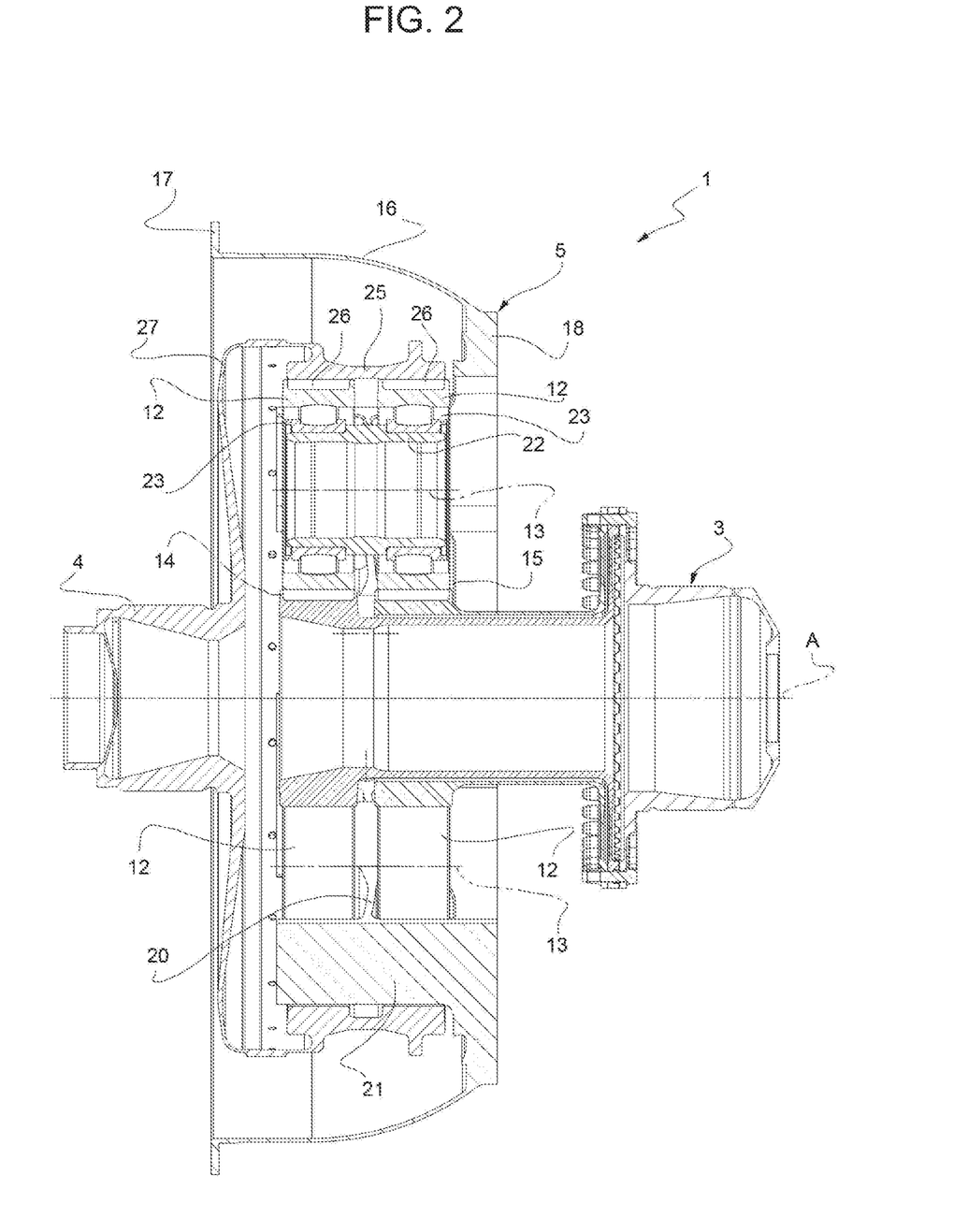
FIG. 2 is a cross section, along a diametrical viewing plane, of the planetary gearing of FIG. 1.

With reference to FIGS. 1 and 2, reference number 1 indicates a planetary gearing for transmitting rotational motion from an input member 3, which can be connected to a power unit (not illustrated) defined for example by a gas turbine engine, to an output member 4 (FIG. 2), which can be connected to a user (not illustrated) defined for example by a propeller.

The members 3 and 4 are coaxial to each other along an axis A and rotate about said axis A at different speeds to one another. The gearing 1 comprises a planetary carrier or gear carrier 5 and a plurality of planet gears 12, which are supported by the planetary carrier 5 so as to rotate about respective axes 13, which are parallel and eccentric with respect to the axis A. The teeth of the planet gears 12, are in an embodiment cylindrical straight teeth.

The planet gears 12 are arranged so as to form two arrays, which are arranged on axially opposite sides with respect to a plane of symmetry, orthogonal to the axis A, and define respective torque transmission paths for transmitting respective torque fractions, as will also be described later on in this document. Each array is formed by at least three planet gears 12 (for example, by five planet gears 12) distributed around the axis A. In particular, the axes 13 of the planet gears 12 of each array are equally spaced angularly with respect to one another about the axis A.

For each of the two arrays, the planet gears 12 mesh directly with a respective sun gear. The two sun gears are indicated by reference numbers 14 and 15 (FIG. 2), they are identical in shape and size and are arranged in positions that are aligned and axially spaced with respect to one another.

Advantageously, the planetary carrier 5 is defined by a monolithic body, i.e., a body formed as a single piece, and comprises an external, substantially bell-shaped structure 16 which, at one axial end is provided with a fixing element 17, for example a flange. The fixing element 17 defines a coupling to connect the planetary carrier 5 in an angularly fixed manner to a member that is not illustrated, i.e., to another motion output member or to a static structure. At the opposite axial end to the fixing element 17, the structure 16 comprises an annular portion 18, shaped so as to define semi-circular front openings, which are coaxial to the planet gears 12 along the axes 13, to permit the assembly of said planet gears 12.

With specific reference to FIG. 2, the planetary carrier 5 further comprises an annular plate 20, which is coaxial to the structure 16 along the axis A, is connected to the portion 18 by means of connecting portions 21 arranged angularly between the planet gears 12, and supports the planet gears 12 by means of respective pins 22, which protrude from the plate 20 in opposite directions along the axes 13. In the specific example, the pins 22 are made as a single piece with the plate 20, so as to form part of the planetary carrier 5. According to an alternative embodiment that is not illustrated, the pins 22 are separate pieces that are fixed to the plate 20, for example by means of an interference coupling. The planet gears 12 are mounted on the respective pins 22 by means of bearings in an embodiment defined by rolling-contact bearings 23, of a known type that is not described in detail here.

The gearing 1 further comprises a crown wheel 25, which is coaxial to the planetary carrier 5 and to the members 3 and 4, surrounds the two arrays of planet gears 12 and has a pair of internal toothing 26 each of which meshes with a corresponding array of planet gears 12. The crown wheel 25 thus reunites the two torque fractions that are transmitted separately by the two arrays of planet gears 12. The crown wheel 25 is fixed with respect to the member 4 and, for example, is connected to the member 4 via a bell-shaped element 27, so as to transmit the overall torque received from the two arrays of planet gears 12. In an embodiment, but not necessarily, the crown wheel 25, the bell-shaped element 27 and the member 4 are parts of a single piece.

Figure 3:
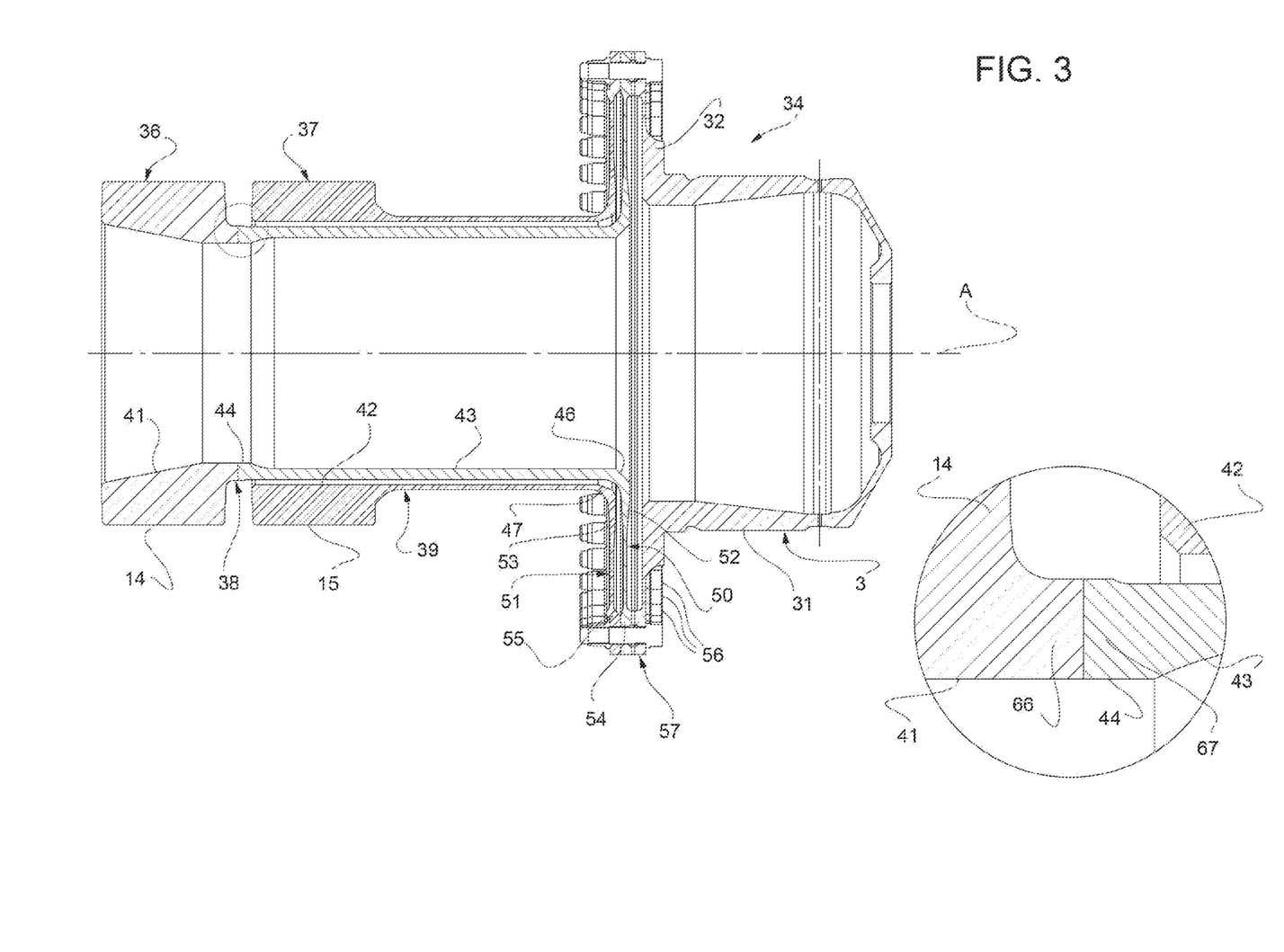
FIG. 3 is similar to FIG. 2 and illustrates the transmission device of FIGS. 1 and 2 on an enlarged scale.

With reference to FIG. 3, the input member 3, in particular, is defined by a hollow flanged body. More in detail, the input member 3 comprises an axially hollow cylindrical portion 31 that is fixed to said power unit so as to be angularly rotatable and axially fixed. The input member 3 further comprises a flange 32 that radially protrudes outwards from an axial end of the portion 31.

The input member 3 is part of a transmission device 34, which splits the torque from the power unit into two fractions, which are as equal to one another as possible, and transmits said torque fractions to the two respective arrays of planet gears via the sun gears 14 and 15.

The device 34 comprises two transmission members 36 and 37, which are coaxial to each other and to the member 3 along the axis A (at least in the project condition) and comprise respective transmission shafts 38 and 39 having, at one axial end, the respective sun gears 14 and 15. In the example shown in FIG. 3, the sun gear 14 radially protrudes outwards from an end portion 41 of the shaft 38 and is formed as a single piece with said portion 41. Likewise, in all the embodiments illustrated in the accompanying figures, the sun gear 15 in an embodiment radially protrudes outwards from an end portion 42 of the shaft 39 and is formed as a single piece with said portion 42.

The shaft 39 is axially hollow, whereas the shaft 38 comprises an intermediate portion 43 having an outside diameter smaller than the inside diameter of the shaft 39 and is housed in the shaft 39 with radial clearance. In an embodiment, the shaft 38 is also axially hollow.

The shaft 38 further comprises an intermediate portion 44 that axially joins the portion 43 to the portion 41 and thus to the gear 14, is placed outside of the shaft 39 and also has an outside diameter smaller than the inside diameter of the shaft 39.

At the ends opposite to the gears 14 and 15, the shafts 38 and 39 end with respective coupling portions 46 and 47, facing and spaced from one another. The members 36 and 37 further comprise respective flanges 50 and 51, which radially protrude outwards with respect to the portions 46 and 47. According to the embodiments illustrated in the accompanying figures, the flange 50 is formed as a single piece with the portion 46 of the shaft 38 and the flange 51 is formed as a single piece with the portion 47 of the shaft 39.

The flanges 50 and 51 comprise respective internal annular portions 52 and 53, which are spaced from one another, and respective external annular portions 54 and 55, which are arranged axially in contact with one another. The portion 54 is, in turn, coupled to the flange 32 of the member 3. The flanges 50 and 51 are axially tightened to each other and fixed to the flange 32, for example by means of a plurality of screws or bolts 56, so as to define a joint 57 that transmits and splits the torque received from the power unit between the two transmission members 36 and 37.

Two pins or reference dowels (not illustrated) are used to assure adequate coaxiality of the shafts 38 and 39 during their assembly and the correct angular phasing of the teeth of the sun gears 14 and 15. Said pins are angularly spaced from each other by 180°, they are arranged at the interface between the annular portions 54 and 55 and are fitted in respective axial holes, each obtained in a space between two adjacent bolts 56.

Advantageously, the members 36 and 37 have a respective torsional rigidity such as to assure the perfect balancing of the torsional rigidity of the two torque paths present between the input member 3 and the output member 4, so as to achieve the perfectly balanced distribution of the torque between the two flanges 50 and 51 at the joint 57.

According to the embodiments that are illustrated, the shaft 38 comprises two bodies that are coaxial to each other along the axis A and are fixed to one another, so as to enable and/or facilitate the axial insertion of the shaft 38 in the shaft 39 during the assembly of the device 34.

In the embodiment illustrated in FIG. 3, said bodies are fixed to each other by means of welding. In an embodiment, the shaft 38 is formed by just two welded bodies. In other words, there is a single welding area on the shaft 38.

Figure 4:
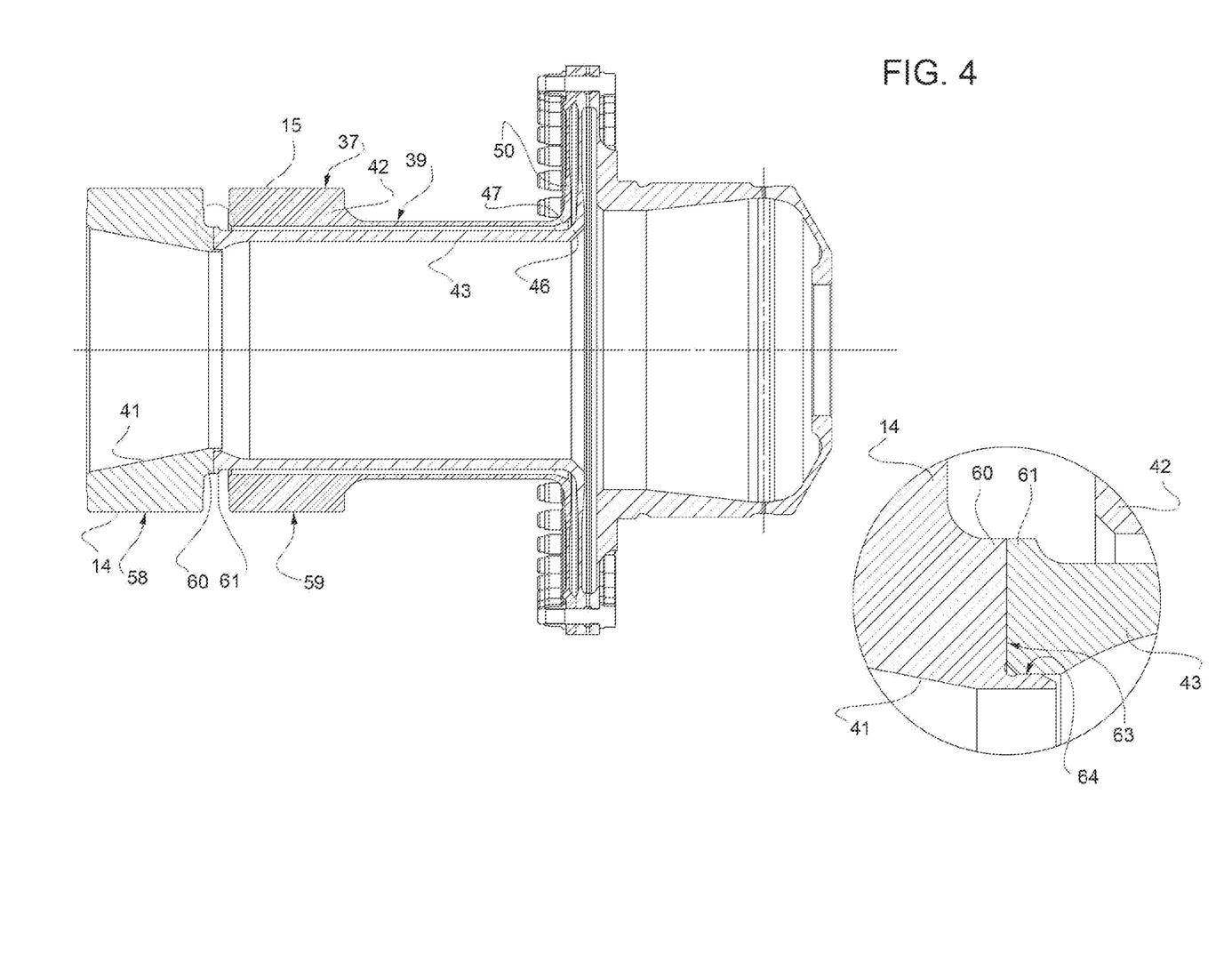
FIG. 4 is similar to FIG. 3 and illustrates a step in the production of the transmission device of FIG. 3, with a detail shown on an enlarged scale.

In particular, with reference to FIG. 4, the shaft 38 is obtained starting from a body 58 and a body 59, which axially end with respective coupling collars 60 and 61, which are complementary to one another so that they can be coupled. In particular, the body 58 is formed by the sun gear 14, by the portion 41 and by the collar 60, which defines an axial protrusion as an extension of the portion 41. At the same time, the body 59 is formed by the flange 50, by the portions 46 and 43 and by the collar 61, which defines an axial extension of the portion 43 and has an outside diameter smaller than the inside diameter of the shaft 39.

In an embodiment, as can be seen in the enlarged view in FIG. 4, the collar 60 defines a seat having an axial shoulder portion 63, so as to be placed axially abutting against the collar 61, and a cylindrical surface 64, having an outside diameter equal to the inside diameter of the collar 61, to fit the collar 61 to the surface 63. Alternatively, of course, the collar 60 could be fitted to a cylindrical surface of the collar 61.

The bodies 58 and 59 and the members 37 and 3 are manufactured separately. In an embodiment, during the processes for manufacturing the body 58 and the shaft 39, the usual finishing process of grinding the surfaces of the straight teeth of the sun gears 14 and 15 is not performed, as these operations are performed after assembling the device 34.

To assemble the device 34, after inserting the body 59 in the shaft 39 so that the collar 61 axially protrudes, the latter is coupled and welded to the collar 60 of the body 58. Conveniently, an electron beam welding or inertia friction welding process is performed.

The coupling and welding area between the collars 60 and 61 is of course advantageously on the portion 44 of the shaft 38. After the welding process, the external and internal surfaces of the collars 60 and 61 are machined and material is removed, to obtain the diameter and the surface characteristics as defined in the project for the portion 44 (FIG. 3). In an embodiment, during these processes, the member 37 is held in a fixed position, spaced apart from the shaft 38, using an appropriate tool (not illustrated).

Therefore, as can be seen in the enlarged view in FIG. 3, the portion 44 is formed by two coaxial annular sections, i.e., by a first section 66 derived from the collar 60 of the body 58, and by a second section 67 derived from the collar 61 of the body 59. The coupling area between the sections 66 and 67 is the area where the shoulder portion 63 was envisaged.

Next, positioning is performed, to adjust the relative angular position of the members 36 and 37 in order to align the teeth of the sun gears 14 and 15, and to adjust the relative radial position of the members 36 and 37 in order to centre the flanges 50 and 51, with respect to each other and with respect to the member 3.

After completing the positioning process, the flanges 50 and 51 are fixed to the flange 32, in particular by tightening the screws or bolts 56.

After completing the fixing process, the flanges 50 and 51 are drilled in order to form two holes parallel to the axis A, angularly spaced apart from each another, for example by 180°. Respective reference pins or dowels are then inserted into said holes, as mentioned previously. Thanks to these reference dowels, the initially achieved assembly position is defined in an unequivocal manner, for any subsequent disassembly and reassembly operations.

Lastly, as mentioned previously, after fixing the flanges 50 and 51, a single grinding process is performed on the straight teeth of both of the sun gears 14 and 15 to grind the surfaces of said teeth (which are already aligned with respect to one another) using a single tool.

In an embodiment, during these processes, the member 37 is held in a position that is fixed and spaced with respect to the shaft 38, using an appropriate tool (not illustrated).

Figure 5:
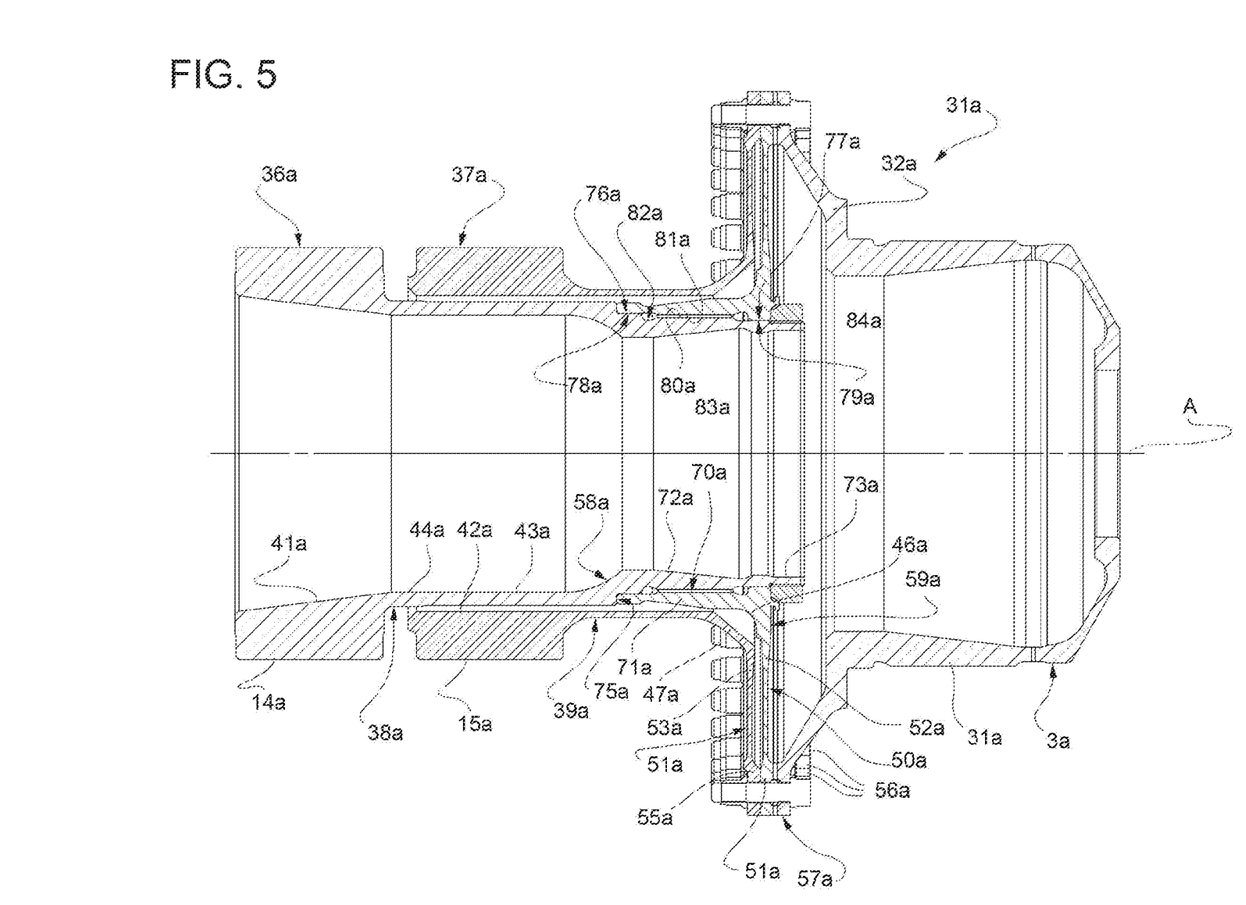
FIG. 5 is similar to FIG. 3 and illustrates a second embodiment of the transmission device for splitting torque between two coaxial gears, according to the present invention.

FIG. 5 illustrates a transmission device 34*a* according to a second embodiment of the present invention. The components of the device 34*a* are indicated, where possible, using the same reference numbers used for the device 34 in FIG. 3, followed by reference letter a.

The member 36*a* has no welded parts, and comprises a body 58*a* and a body 59*a* that are coupled to each other in an angularly fixed manner, for example by means of a splined coupling 70*a*. According to this embodiment, the coupling 70*a* is arranged between the portion 43*a* and the portion 46*a*, inside the shaft 39*a*, and substantially defines an axial extension of the portion 43*a*. The body 58*a* is in an embodiment made as a single piece and is formed by the sun gear 14*a*, by the portions 41*a* and 44*a*, by the portion 43*a*, by a tubular portion or sleeve 72*a*, which axially and radially protrudes outwards with respect to the portion 43*a*, and an end collar 73*a*, which is externally threaded and defines an axial extension of the sleeve 72*a* beyond the flange 50*a*. The body 59*a* is in an embodiment made as a single piece and is formed by the flange 50*a*, by the portion 46*a* and by a tubular portion or sleeve 74*a*, which axially protrudes from the portion 46*a* and is fitted to the sleeve 72*a*.

The sleeve 72*a* has an outside diameter smaller than the portion 43*a*. Therefore, the latter has an axial shoulder portion 75*a*, against which the sleeve 74*a* axially abuts. Externally, the sleeve 72*a* has two cylindrical end surfaces 76*a* and 77*a*, coupled to corresponding internal cylindrical surfaces 78*a* and 79*a* of the sleeve 74*a*; and an intermediate splined area 81*a* coupled to a corresponding intermediate splined area 81*a* of the sleeve 74*a* so as to define the coupling 70*a*. In particular, the splined areas 80*a* and 81*a* are respectively spaced apart from the surfaces 76*a* and 79*a*, by means of discharge grooves 82*a* and 83*a*.

A ring nut or nut screw 84*a* is screwed onto the collar 73*a* so as to axially tighten the sleeve 74*a* against the shoulder portion 75*a* and thus axially lock the bodies 58*a* and 59*a*. In other words, the sleeve 72*a* acts as a stay that keeps the sleeve 74*a* locked between the shoulder portion 75*a* and the ring nut 84*a*.

As regards the member 3*a*, with respect to the shape of the member 3, the flange 32*a* is in an embodiment shaped so as to allow more room for screwing and tightening the ring nut 84*a* onto the collar 73*a*.

According to a first method of assembly for assembling the device 34*a*, after manufacturing the bodies 58*a* and 59*a* and the members 37*a* and 3*a* separately, the bodies 58*a* and 59*a* are axially inserted in the member 37*a* and coupled to each other by means of the coupling 70*a*. The ring nut 84*a* is screwed onto the collar 73*a*, but without screwing it tightly. The flanges 50*a* and 51*a* are also coupled to the flange 32*a*, without screwing the screws or bolts 56*a* tightly.

Next, the shaft 38*a* is subjected to torsion, in a direction that is the same as the direction that will actually occur during the use of the gearing 1, so as to eliminate any clearance in the coupling 70*a* in an angular direction. After said torsion, i.e., after eliminating any clearance, the ring nut 84*a* is tightened.

Lastly, as explained previously for the device 34, a positioning process is performed, to axially align the teeth of the sun gears 14*a* and 15*a* and to centre the flanges 50*a* and 51*a*. After completing the positioning process, the flanges 50 and 51 are fixed to the flange 32, by tightening the screws or bolts 56. Lastly, as explained above for the device 34, in an embodiment, two reference pins or dowels are installed through the flanges 50a and 51a, in positions that are angularly spaced apart from each other (for example by 180°), so as to define in an unequivocal manner the achieved assembly position, which can easily be achieved following any subsequent disassembly and reassembly operations.

To assemble the device 34a, a second method may be used, instead of the method described above, and is partially illustrated in FIG. 6.

Figure 6:
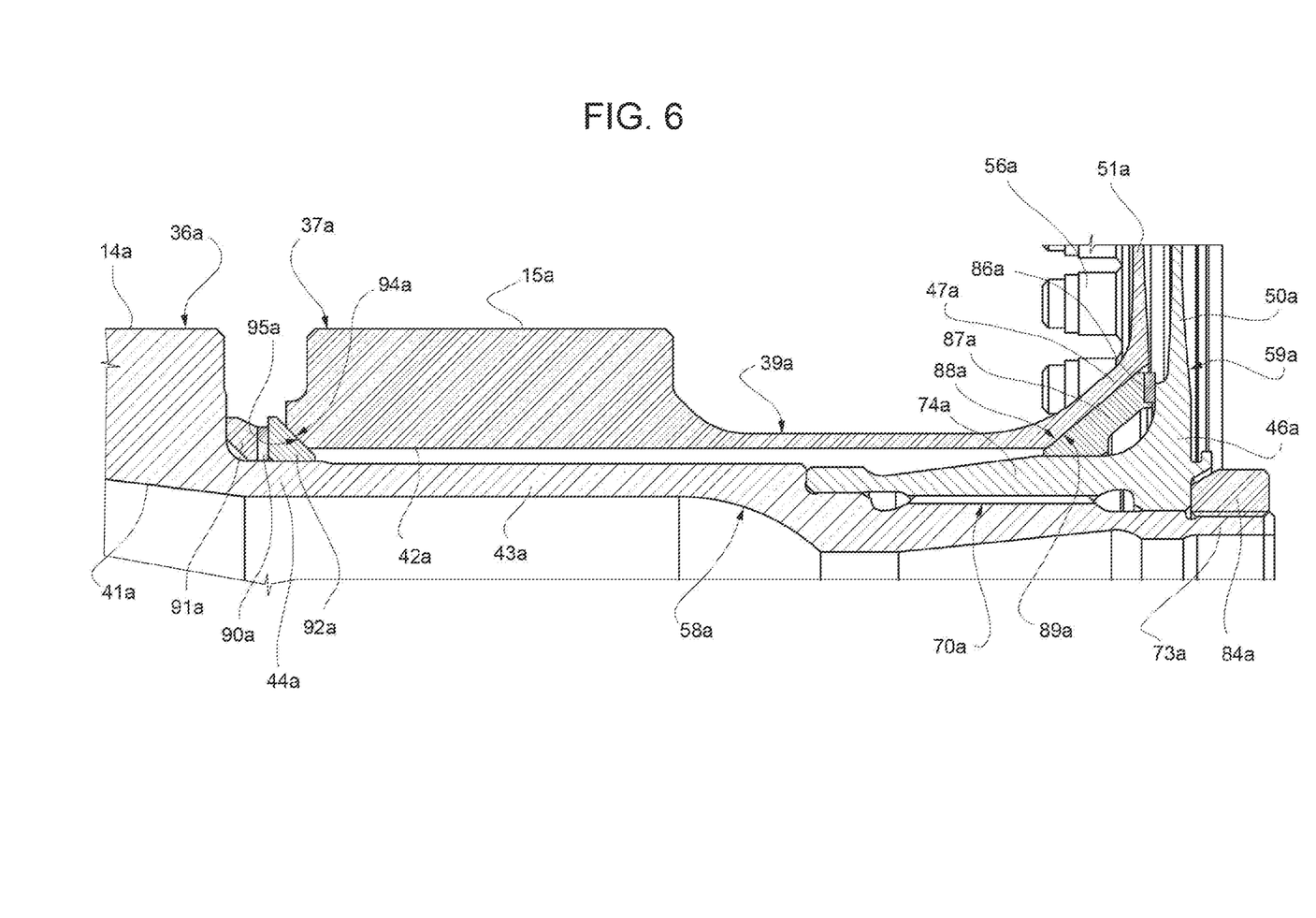
FIG. 6 illustrates a detail of the device of FIG. 5, on an enlarged scale, during a final machining step on said device.

In an embodiment, during the manufacturing step, the body 58a and the member 37a are made without performing the usual finishing process of grinding the teeth of the gears 14a and 15a.

Before inserting the sleeve 74a of the body 59a in the shaft 39a, a spacer 86a and a centring ring 87a are fitted around the sleeve 74a. The spacer 86a comes into axial contact with the portion 46a and/or the flange 50a. The ring 87a has an inside diameter equal to the outside diameter of the sleeve 74a, so that it couples with an external surface thereof. The ring 87a, on one side, axially rests against the spacer 86a and, on the opposite side, has a conical surface 88a which is complementary to a corresponding conical surface 89a of the portion 47a. When the sleeve 74a is inserted in the shaft 39a, the conical surface 88a couples with the conical surface 89a, so as to keep the body 59a centred with respect to the member 37a. The axial thickness of the spacer 86a is chosen and/or adjusted so that the flanges 50a and 51a are in axial contact with each other when the conical surfaces 88a and 89a are coupled.

Before inserting the body 58a in the shaft 39a, a spacer 90a and at least one centring ring 92a are fitted around the portion 44a of the body 58a. An additional ring 91a may be placed axially abutting against the sun gear 14a, so that the spacer 90a remains axially arranged between the rings 91a and 92a. The ring 92a has an inside diameter equal to the outside diameter of the portion 44a, so that it couples with an external cylindrical surface of the portion 44a. On one side, the ring 92a axially abuts against the spacer 90a and, on the opposite side, it has a conical surface 94a which is complementary to a corresponding conical surface 95a of the portion 42a. When the body 58a is inserted in the shaft 39a and coupled to the sleeve 74a of the body 59a by means of the coupling 70a, the conical surface 94a couples with the conical surface 95a, so as to keep the body 58a centred with respect to the shaft 39a.

Before fitting the ring nut 84a, the axial thickness of the spacer 90a is chosen and/or adjusted so as to subsequently achieve a desired axial load on the shaft 39a by tightening, i.e., a load that also allows the shaft 39a to be locked.

The ring nut 84a is screwed onto the collar 73a, but without screwing it tightly. In particular, the flanges 50a and 51a are also coupled to the flange 32a (not visible in FIG. 6), without screwing the screws or bolts 56a tightly.

Next, the shaft 38a is subjected to torsion, in a direction that is the same as the direction that will actually occur during the use of the gearing, so as to eliminate any clearance in the coupling 70a in an angular direction.

After the torsion step, i.e., after eliminating any clearance, the ring nut 84a is screwed tightly in order to lock the bodies 58a and 59a to each other.

As mentioned above, thanks to the previous selection or adjustment of the spacer 90a, in this method of assembly, when the ring nut 84a is tightened the shaft 39a is locked in a position that is automatically centred with respect to the shaft 38a, thanks to the rings 87a and 92a with conical surfaces 88a and 94a and thanks to the corresponding conical surfaces 89a and 95a, which are provided at the axial ends of the shaft 39a in positions facing towards the shaft 38a. In particular, centring is performed effectively and with precision and does not require additional operations for radially positioning the flanges 50a and 51a with respect to each other.

Moreover, in an embodiment, before tightening the ring nut 84a, the shaft 38a is angularly positioned with respect to the shaft 39a so as to axially align the straight teeth of the gears 14a and 15a.

After tightening the ring nut 84a, the nuts or bolts 56a are also tightened to lock the flanges 50a and 51a to each other.

Two reference pins or dowels, angularly spaced apart from each other, for example by 180°, are then installed through the flanges 50a and 51a, which have already been fixed to each other, so as to define in an unequivocal manner the achieved assembly position.

In an embodiment, these assembly steps are followed by a process of grinding the straight teeth of both of the gears 14a and 15a in order to grind the aligned surfaces of said straight teeth using a single tool.

Next, the device 34a is disassembled to remove the spacers 86a and 90a and the rings 87a, 91a and 92a and to allow any additional finishing processes to be performed. The device 34a is then reassembled using the positioning defined by the two reference dowels. When reassembling the shaft 38a a torsion must again be applied to eliminate any clearance before tightening the ring nut 84a.

Figure 7:
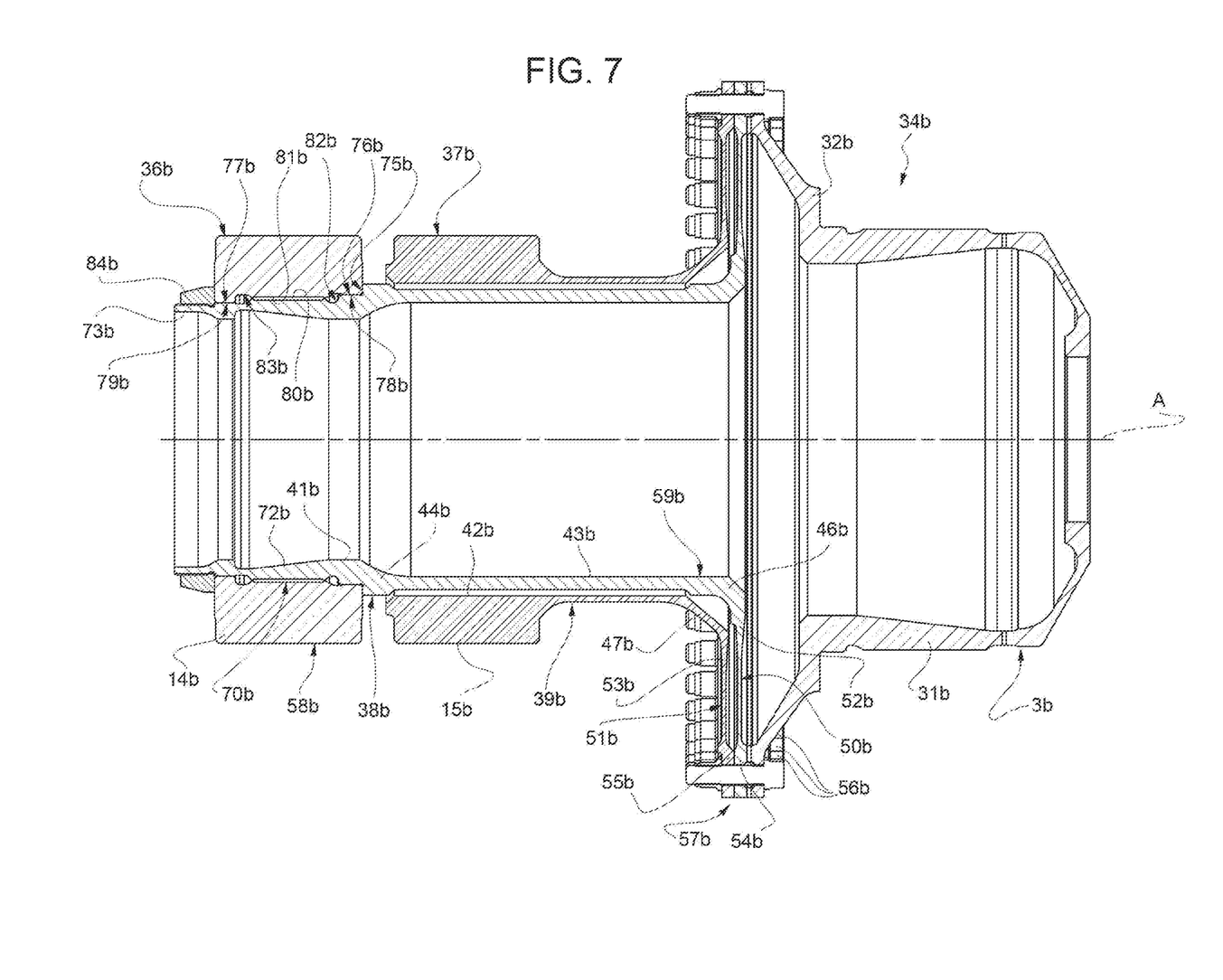
FIGS. 7 and 8 are similar to FIGS. 5 and 6, respectively, and refer to a third embodiment of the transmission device for splitting torque between two coaxial gears, according to the present invention.
Figure 8:
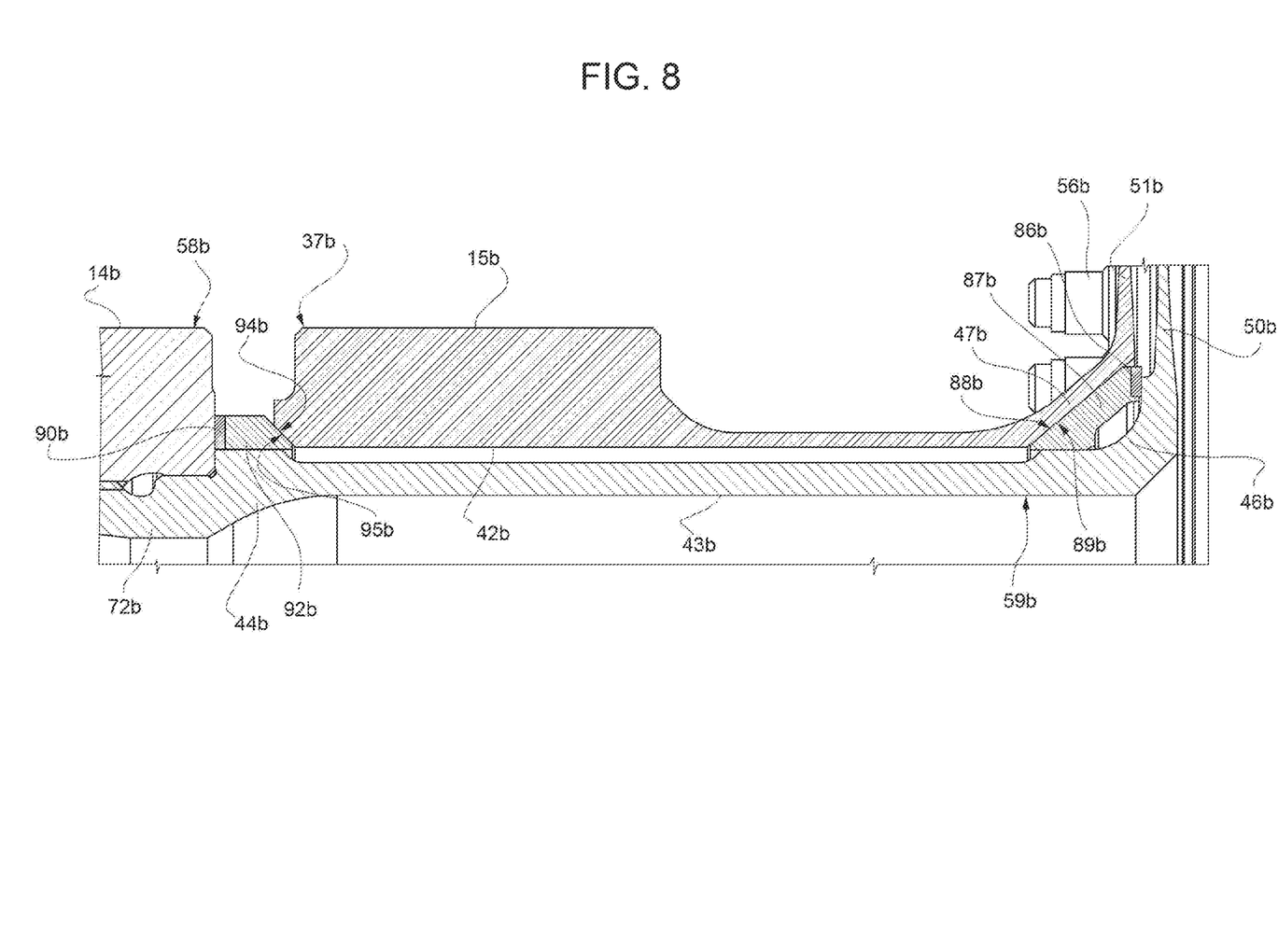

FIGS. 7 and 8 are similar to FIGS. 5 and 6 and illustrate a transmission device 34a according to a third embodiment of the present invention. The components of the device 34b are indicated, where possible, using the same reference numbers used for the device 34a, but using reference letter b instead of reference letter a.

According to this embodiment, the splined coupling 70b is on the portion 41b. In particular, the body 58b is formed as a single piece and is defined by the gear 14b and is keyed in an angularly fixed position to the body 59b thanks to the splined coupling 70b. The body 59b is in an embodiment made as a single piece and is formed by the flange 50b, by the portions 46b, 43b and 44b, by a sleeve 72b similar to the sleeve 72a and by a collar 73b similar to the collar 73a. The portion 44b has an axial shoulder portion 75a, against which the body 58b axially abuts. Moreover, the body 58b has an internal annular surface comprising cylindrical end surfaces 78b and 79b, coupled to respective cylindrical surfaces 76b and 77b of the sleeve 72b; in an intermediate axial position between said surfaces, the body 58b has a splined area 81b, coupled to a splined area 80b of the sleeve 72b to define the splined coupling 70b.

Also in this embodiment, a ring nut 84b is screwed onto the collar 73b so as to axially lock the body 58b against the shoulder portion 75b. In other words, the sleeve 72a acts as a stay that keeps the body 58b locked between the shoulder portion 75b and the ring nut 84b.

The device 34b can be assembled by following either the first method of assembly or the second method described above for the device 34a, making the appropriate and obvious adaptations (in particular, the sleeve 72b is inserted through the entire shaft 39b and made to protrude from the latter so as then to be coupled to the inside surface of the body 58b in an angularly fixed manner by means of the coupling 70b; the ring 87b has an inside diameter equal to the outside diameter of a surface of the portion 46b; etc.). The steps of these methods of assembly are therefore not repeated here, for the sake of conciseness.

Figure 9:
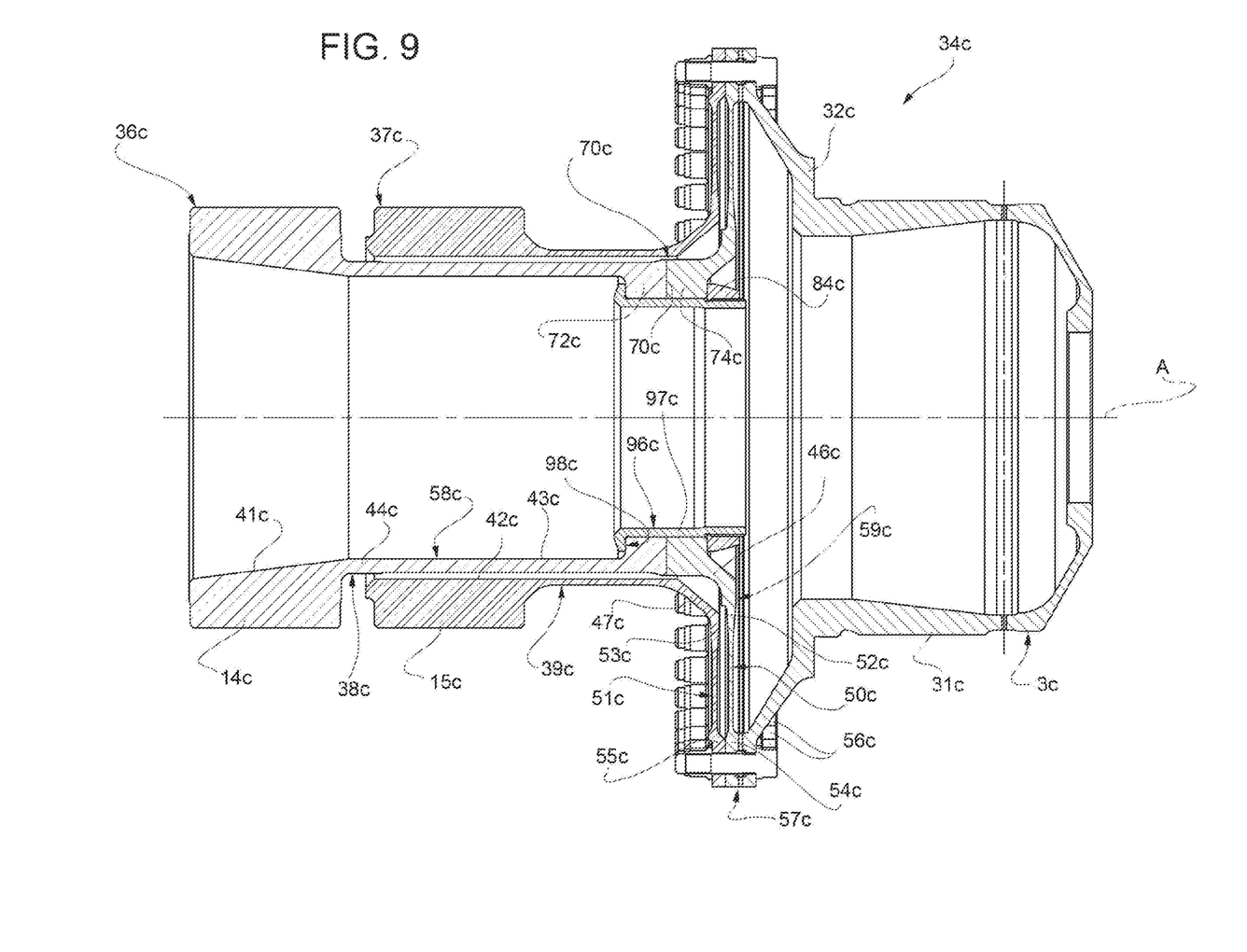
FIGS. 9 and 10 are similar to FIGS. 5 and 6, respectively, and refer to a fourth embodiment of the transmission device for splitting torque between two coaxial gears, according to the present invention.
Figure 10:
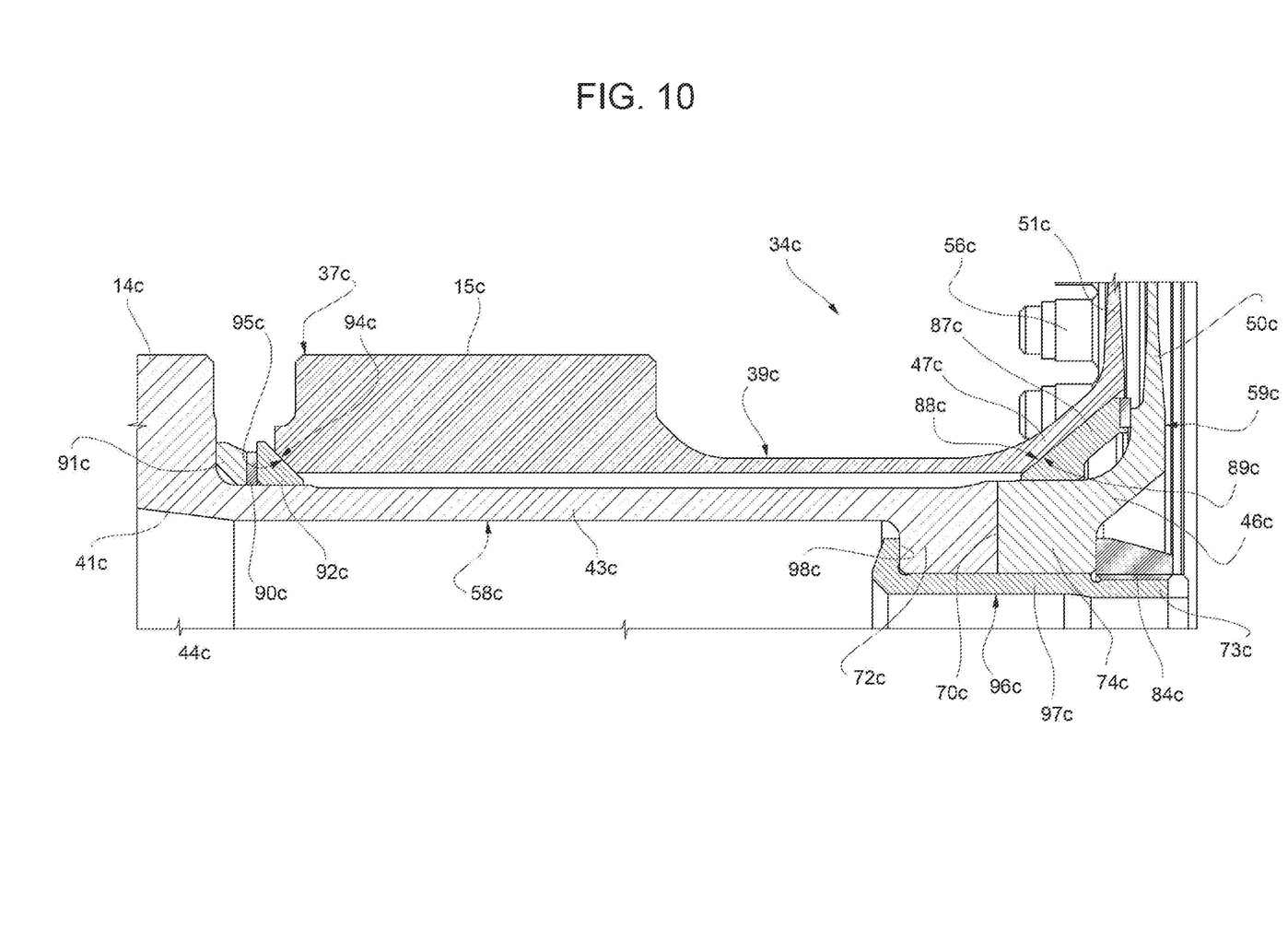

FIGS. 9 and 10 are similar to FIGS. 5 and 6 and illustrate a transmission device 34c according to a fourth embodiment of the present invention. The components of the device 34c are indicated, where possible, using the same reference numbers used for the device 34a, but using reference letter c instead of reference letter a.

In this case, the splined coupling 70a is replaced with a front dog clutch or coupling 70c: in particular, the sleeves 72a and 74a are replaced, respectively, with a ring 72c that is part of the body 58c and with a ring 74c that is part of the body 59c. The rings 72c and 74c are axially facing each other and are provided with respective front teeth, of a type known in the prior art and not illustrated here, having a complementary shape in order to mesh with one another in an angularly fixed manner and form the coupling 70c.

In the specific example that is illustrated, the coupling 70c is placed axially between the portion 43c and the portion 46c, that is, at an axial end of the shaft 38c opposite to the gear 14c. In particular, the body 58c is made as a single piece and is formed by the gear 14c, by the portions 41c, 44c and 43c, and by the ring 72c. At the same time, the body 59c is made as a single piece and is formed by the flange 50c, by the portion 46c and by the ring 74c.

However, according to embodiments which are not illustrated, the coupling 70c could be arranged in another axial position, for example on the portion 41c.

In particular, the rings 72c and 74c radially protrude inwards from the portions 43c and 46c.

The collar 73a is replaced with a collar 73c defining the axial end of a tubular element or bushing 96c, which defines a piece that is separate from the bodies 58c and 59c and comprises an intermediate portion 97c having an outside diameter equal to the inside diameter of the rings 72c and 74c. The latter are fitted to the portion 97c and are thus supported and held coaxial to each other by an external cylindrical surface of the portion 97c.

At the opposite axial end with respect to the collar 73c, the bushing 96c has an external flange that defines an axial shoulder portion 98c placed abutting against the ring 72c. Therefore, the portion 97c of the bushing 96c acts as a stay that keeps the rings 72c and 74c axially locked, between the shoulder portion 98c and a ring nut 84c that is screwed and tightened onto the collar 73c.

By choosing the appropriate type of front teeth of the rings 72c and 74c (for example with a type of coupling known as Curvic®) a solution can be achieved in which the axial tightening of the lock nut 84c cancels out any radial clearance in an angular direction between the rings 72c and 74c.

Figure 11:
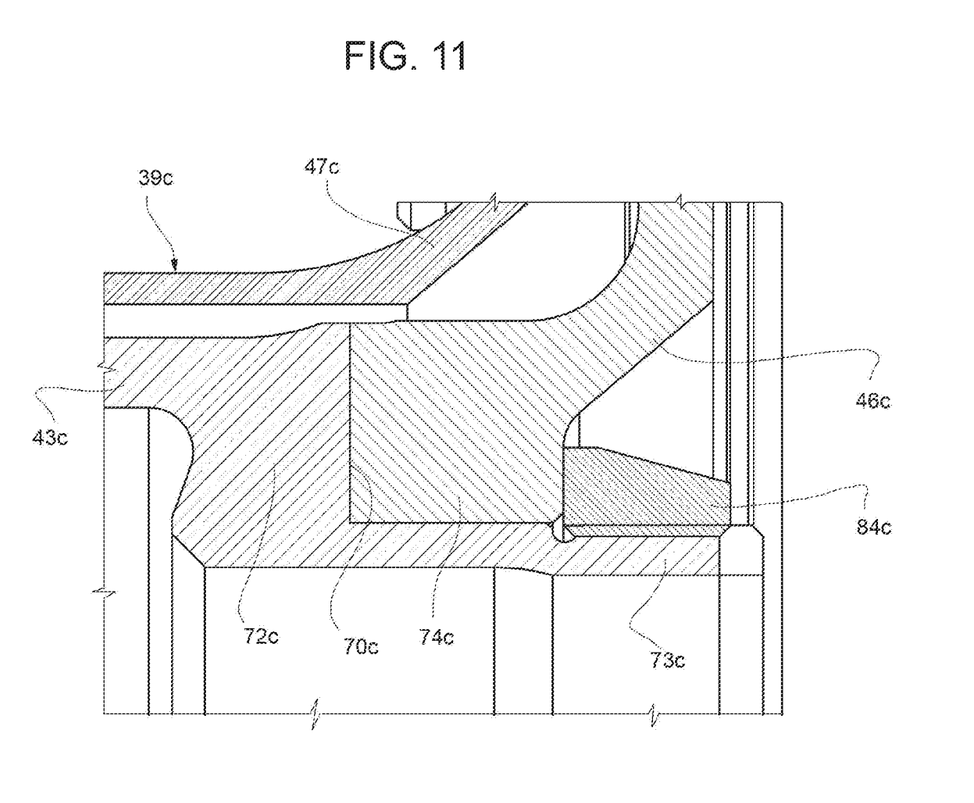
FIG. 11 is an enlarged scale view of a detail of an alternative embodiment of the device of FIG. 9.

In the alternative embodiment illustrated in FIG. 11, the portion 97c and the collar 73c are made as a single piece with the ring 72c, which means there is no bushing as an additional piece. In this case, of course, the external cylindrical surface of the portion 97c only supports the ring 74c.

The device 34c can also be assembled by following either the first method of assembly or the second method described above for the device 34a, making the appropriate and obvious adaptations (instead of coupling the sleeves 72a and 74a to each other, the rings 72c and 74c are fitted to each other, with the support of the portion 97c; the ring 87c has an inside diameter equal to the outside diameter of a surface of the portion 46c; etc.). The steps of these methods of assembly are therefore not repeated here, for the sake of conciseness. However, among the assembly steps described above, the shaft 38c does not generally have to be subjected to torsion to eliminate the angular clearance at the coupling 70c between the bodies 58c and 59c, because such clearance is automatically eliminated by tightening the ring nut 84c, as explained above.

From the above description, it is clear that the assembly procedure can be performed relatively simply and with satisfactory tolerances, thanks to the fact that the shaft 38,38a,38b,38c is made of at least two parts which are coaxial and are fixed to each other by means of welding or mechanical means (in particular, the couplings 70a,70b, the coupling 70c and the ring nuts 84a,84b,84c).

Therefore, the solutions that are proposed enable the manufacture, assembly and actual use of a gearing with separate and independent sun gears, to which the torque is delivered split into two torque fractions thanks to the joint 57,57a,57b,57c. In particular, A configuration of the device 34,34a,34b,34c of this type is particularly efficient for splitting torque into equal portions while, at the same time, respecting the design requirements of the gearing 1 in terms of overall dimensions, tolerance and movements due to deformation during use.

The fact that the device 34,34a,34b,34c can actually be manufactured while respecting the design requirements in terms of tolerances and deformation during use means the torque can be split between the two arrays of planet gears 12 in the best way thus achieving the best distribution of power between the two arrays and between the planet gears 12 of each array.

Furthermore, particularly low assembly tolerances, in relation to the centring of the member 36a,36b,36c and the member 37a,37b,37c, can be achieved using the centring rings illustrated in FIGS. 6, 8 and 10, exploiting the conical shape of the surfaces 89a,89b,89c and of the surfaces 95a,95b,95c.

The fact that grinding is performed after completing the assembly processes contributes to reducing tolerances as far as the sun gears are concerned, and to reducing machining times, since such operations are only performed once on both sun gears.

The coupling tolerances between the two bodies of the shaft 39a,39b,39c are reduced not only as a consequence of the proposed methods of assembly, but also thanks to the particular construction characteristics described above.

Moreover, a relatively small number of parts are required to assemble the device 34a,34b,34c. With the exception of the solution in FIG. 9, only one additional element is in fact required, namely the ring nut 84a,84b,84c.

Lastly, it is clear that modifications and variations may be made to the device 34,34a,34b,34c and to the method of assembly thereof described above with reference to the accompanying figures, without departing from the scope of the present invention, as set forth in the appended claims.

In particular, the device 34,34a,34b,34c could be used for a gearing other than the gearing 1 or for a gear transmission of a different kind, in which the torque has to be split between two parallel transmission stages.

What we claim is:

1. A transmission device for splitting torque between two coaxial gears of a planetary gearing for aeronautic applications, the device comprising:
    a motion input member;
    a first and a second transmission member, which are coaxial to each other and to said motion input member along a longitudinal axis and comprise:
        a first shaft having a first gear at an axial end, and a first intermediate portion, wherein said first shaft is formed by at least two pieces which are coaxial and fixed to each other;
        a second shaft having a second gear at an axial end, wherein said second shaft is axially hollow and defines an inside diameter, wherein said first intermediate portion has an outside diameter smaller than said inside diameter of said second shaft and is housed in said second shaft with radial clearance;

a first flange radially protruding outwards from said first shaft at an axial end opposite to said first gear;

a second flange radially protruding outwards from said second shaft at an axial and opposite to said second gear, wherein the first and second flanges are axially facing and placed abutting against each other and are fixed to said motion input member so as to split the torque transmitted from said motion input member between said first and second flanges; and a centering ring coupled around the first shaft and having an inside diameter equal to an outside diameter of the first shaft, the centering ring comprising a conical surface which is complementary to a corresponding conical surface of said second shaft.

2. The device according to claim 1, wherein said at least two pieces are coupled to each other in a rotationally fixed manner; the first shaft further comprising a tightening ring nut screwed onto one of the said at least two pieces so as to axially lock said at least two pieces to each other.

3. The device according to claim 2, wherein said at least two pieces are coupled to each other in an angularly fixed manner by means of a splined coupling or by means of a front dog coupling.

4. The device according to claim 3, wherein said splined coupling or said front dog coupling is arranged radially inside said second shaft.

5. The device according to claim 3, wherein said splined coupling is arranged at said first gear.

6. The device according to claim 3, wherein said at least two pieces are coupled to each other in an angularly fixed manner by means of a front dog coupling, and said ring nut is screwed onto a collar which extends as an axial extension of a tubular portion; at least one of said at least two pieces being fitted onto said tubular portion.

7. The device according to claim 2, wherein said ring nut is screwed onto a collar forming part of one of said at least two pieces.

8. The device according to claim 2, wherein said second shaft has, at its opposite axial ends, respective conical surfaces facing towards said first shaft.

9. A method for manufacturing and assembling a transmission device for splitting torque between two coaxial gears of a planetary gearing for aeronautic applications, the transmission device comprising a motion input member, a first transmission member, and a second transmission member, the first and second transmission members being coaxial to each other and to said motion input member along a longitudinal axis and comprise:

a first shaft having a first gear at an axial end, and a first intermediate portion, wherein said first shaft is formed by at least two pieces which are coaxial, the first shaft further comprising a tightening ring nut screwed onto one of the said at least two pieces so as to axially lock said at least two pieces to each other, a second shaft having a second gear at an axial end, wherein said second shaft is axially hollow and defines an inside diameter, wherein said first intermediate portion has an outside diameter smaller than said inside diameter of said second shaft and is housed in said second shaft with radial clearance, a first flange radially protruding outwards from said first shaft at an axial end opposite to said first gear;

a second flange radially protruding outwards from said second shaft at an axial and opposite to said second gear, wherein the first and second flanges are axially facing and placed abutting against each other and are fixed to said motion input member so as to split the torque transmitted from said motion input member between said first and second flanges; and a centering ring coupled around the first shaft and having an inside diameter equal to an outside diameter of the first shaft, the centering ring comprising a conical surface which is complementary to a corresponding conical surface of said second shaft the method comprising the steps of:

axially inserting at least one of said pieces in said second shaft;

coupling said pieces to each other in an angularly fixed manner, after the axial insertion step;

screwing said ring nut onto a corresponding collar, without screwing it tightly;

positioning said first and second transmission members so as to axially align the teeth of said first and second gears;

tightening said ring nut after the positioning step; and after the tightening step, fixing said first and second flanges to said motion input member.

* * * * *